(12) United States Patent
Massidda et al.

(10) Patent No.: US 7,018,461 B2
(45) Date of Patent: Mar. 28, 2006

(54) RELEASE AGENTS

(75) Inventors: Joseph F. Massidda, Montross, VA (US); Alan P. Short, Daphne, AL (US)

(73) Assignee: Cellulose Solutions, LLC, Daphne, AL (US)

( * ) Notice: Subject to any disclaimer, the term of this patent is extended or adjusted under 35 U.S.C. 154(b) by 455 days.

(21) Appl. No.: 10/321,517

(22) Filed: Dec. 18, 2002

(65) Prior Publication Data
US 2003/0160363 A1 Aug. 28, 2003

Related U.S. Application Data

(60) Provisional application No. 60/359,379, filed on Feb. 26, 2002, provisional application No. 60/358,378, filed on Feb. 22, 2002.

(51) Int. Cl.
*B29C 7/36* (2006.01)

(52) U.S. Cl. ............... 106/38.24; 106/38.22; 106/38.25; 264/338

(58) Field of Classification Search ............ 106/38.22, 106/38.24, 38.25; 264/338
See application file for complete search history.

(56) References Cited

U.S. PATENT DOCUMENTS

| | | | | |
|---|---|---|---|---|
| 3,726,952 A | * | 4/1973 | Boden et al. | 264/48 |
| 3,925,527 A | * | 12/1975 | Kleimann et al. | 264/53 |
| 4,028,120 A | * | 6/1977 | Emond | 106/38.24 |
| 4,058,492 A | * | 11/1977 | VON Bonin et al. | 521/110 |
| 4,076,666 A | * | 2/1978 | Power et al. | 525/162 |
| 4,257,995 A | | 3/1981 | McLaughlin et al. | |
| 4,257,996 A | | 3/1981 | Farrissey, Jr. et al. | |
| 4,609,570 A | | 9/1986 | Couleau et al. | |
| 4,892,585 A | * | 1/1990 | Fischer et al. | 106/38.22 |
| 5,133,804 A | * | 7/1992 | Culpon, Jr. | 106/38.24 |
| 5,194,584 A | | 3/1993 | Leahy | |
| 5,308,393 A | * | 5/1994 | Hattich et al. | 106/38.22 |
| 5,399,310 A | * | 3/1995 | Payne et al. | 264/338 |
| 5,908,496 A | | 6/1999 | Singule et al. | |
| 5,942,058 A | | 8/1999 | Sleeter et al. | |
| 6,132,503 A | | 10/2000 | Singule et al. | |
| 6,231,656 B1 | | 5/2001 | Dekerf et al. | |
| 6,734,280 B1 | * | 5/2004 | Hutter | 528/339.5 |

FOREIGN PATENT DOCUMENTS

| | | |
|---|---|---|
| EP | 0046014 A1 | 2/1982 |
| EP | 0057502 B1 | 6/1984 |

\* cited by examiner

*Primary Examiner*—Allan R. Kuhns
(74) *Attorney, Agent, or Firm*—Millen, White, Zelano & Branigan, P.C.

(57) ABSTRACT

The invention provides release agents and methods for preparing textiles and molded articles there from. Lignocellulosic materials, concrete and polyurethane foam can be molded with these release agents. The release agents comprise the salt of tall oil fatty acids, preferably of very high purity. A synthetic wax and/or silicone resin is used with the tall oil fatty acids in preferred embodiments. The tall oil fatty acids contain less than 10 wt %, based on the total weight of the tall oil fatty acid, of unsaponifiables and less than 1 wt %, based on the total weight of the tall oil fatty acid, of rosin acid.

37 Claims, No Drawings

RELEASE AGENTS

RELATED APPLICATIONS

This application claims the benefit of U.S. provisional application Ser. No. 60/359,379 filed Feb. 26, 2002 and U.S. provisional application Ser. No. 60/358,378 filed Feb. 22, 2002.

BACKGROUND OF THE INVENTION

This invention relates to release agents used in various molding processes and textile manufacturing processes and methods for using these release agents. The release agents find use in molding/pressing lignocellulosic materials, casting concrete and molding polymer foams. The release agents also find use in textile handling equipment during manufacture.

One of the problems associated with pressing/molding processes, especially when processing wood, concrete and polyurethane foam, is that it is difficult for the articles formed of these materials to be released from the equipment used. It is well known in the art to employ release agents to aid in the removal of articles produced from the manufacturing equipment used. Examples of release agents include oils, wax, polishes, metallic salts, silicones and polytetrafluoroethylene. Release agents have been applied to molding/pressing equipment such as press platens and they also have been applied to the materials to be processed. The following patents are representative of the art of release agents:

U.S. Pat. No. 4,257,995 issued to McLaughlin et al.;

U.S. Pat. No. 4,257,996 issued to Farrissey, Jr. et al. on Mar. 24, 1981;

U.S. Pat. No. 4,609,570 issued to Couleau et al. on Sep. 3, 1986;

U.S. Pat. No. 5,908,496 issued to Singule et al. on Jun. 1, 1999;

U.S. Pat. No. 5,194,584 issued to Leahy on Mar. 16, 1993;

U.S. Pat. No. 5,942,058, issued to Sleeter et al. on Aug. 24, 1999;

U.S. Pat. No. 6,132,503 issued to Singule et al. on Oct. 17, 2000;

U.S. Pat. No. 6,231,656 issued to Dekerf et al. on May 15, 2001;

EP 46014, and

EP 57502.

Release agents are especially useful when molding lignocellulosic materials such as wood sheets, chips, fibers, flakes, strands, etc., into composite structures with polyisocyanate adhesives. Certain agents are used internally, i.e., as an emulsion or mixture with the polyisocyanate adhesive and others are applied externally, i.e., applied to the metal surfaces of the press platens and/or the lignocellulosic material itself. In typical molding processes, lignocellulosic materials of a desired size and shape are prepped and coated with an adhesive comprised of a polyisocyanate or phenolic resin (urea formaldehyde, phenol-formaldehyde, melamine urea formaldehyde, and melamine formaldehyde resins.). Polyisocyanate binders have been favored over phenolic resins in binding certain lignocellulosic materials. The adhesive coated lignocellulosic materials are loaded into a press where heat and pressure are applied simultaneously in order to compress the lignocellulosic material to a desired thickness and activate the adhesive. The lignocellulosic material is then bonded to form the desired composite product. Examples of composite products comprised of lignocellulosic materials include: particle board, oriented strand board (OSB), plywood, chip board, medium density fiber board (MDF), hardboard, and structural strand lumber.

A suitable release agent remains free flowing within the intended use temperatures and should be shelf stable for extended periods. In selecting a release agent, it is desirable that the agent not only have the properties necessary to provide adequate release of the article produced from the equipment employed, but it should be non-staining, i.e., it should not discolor the products. For example, tall oil fatty acids have been used as release agents for lignocellulosic materials but suffer from discoloring the molded articles formed. It is desirable for the release agent not to discolor the molded article to reduce finishing. In the case of oriented strand board, it is desirable to eliminate the need to sand the panel except to achieve caliper.

Certain release agents can also lead to considerable build up of wax, rosin or other deposit forming material on the equipment used, which is undesirable. It is desirable to reduce, preferably eliminate, these deposits on the equipment utilized.

Preferably, the release agent is non-corrosive to the molded produced and the equipment employed. It is desirable that the release agent minimizes the corrosive effects of water, acids and other aggressive agents in preparing molded articles.

It is also desirable to minimize ambient air odor or VOC when spraying the release agent to avoid environmental hazards in its use, storage and disposal and to improve productivity.

Another feature desired is to increase the memory of a release agent. This is defined herein as the ability of a release agent to perform its function after unscheduled equipment shut down and after the release agent has been applied. This allows the line to start up again without dumping a portion of the web or re-wetting the web with more release agent. This allows for downtime during the manufacturing process with few, and preferably no additional steps necessary to restart the process.

It is also desirable to enhance the release properties of a release agent so that less is required, thereby reducing the cost of manufacturing.

There is a continuing effort to provide release agents with a better balance of these properties.

SUMMARY OF THE INVENTION

The present invention provides a release agent comprising an alkali metal salt, preferably potassium, of a tall oil fatty acid of very high purity and an aqueous carrier.

The present invention also provides a release agent comprising a combination of a potassium salt of a tall oil fatty acid and a synthetic wax. The release agent also comprises an aqueous carrier. The water content of the release agent can vary widely to dilute the active components as needed. The release agents of this invention include "ready to use" formulations as well as concentrates.

The present invention also provides a method of manufacturing molded articles using the release agent of this invention. The materials which can be molded with this release agent vary widely and include lignocellulosic materials, concrete and polyurethane foam.

Tall oil fatty acids are derived from wood products and paper making, Tall oil fatty acids are a complex combination of fatty acids obtained by distillation of tall oil. They typically comprise at least 90% fatty acids, primarily oleic aid and linoleic acids, the remainder typically being rosin and neutral materials. The tall oil fatty acids used in this invention contain less than 10 wt % unsaponifiables.

The "unsaponifiables" within tall oil products referred to herein include non-acidic material, both free and combined, as defined in STMD 1065-96 "Unsaponifiable matter in naval stores, including rosin, tall oil and related products." Section 3.2 of that procedure states as follows. "The amount of unsaponifiable matter in tall oil and other related products is important in characterizing such products as it indicates the level of nonacidic material, both free and combined, present in the test material. The unsaponifiable in naval stores products is primarily composed of higher molecular weight alcohols, sterols, and hydrocarbons." Unsaponifiables, as referred to herein includes materials known as rosin, rosin bottoms, rosin acid, DTO and pitch.

Tall oil fatty acids with less than 10 wt % unsaponifiables are available commercially. For example, Arizona Chemical provides a significant number of tall oil fatty acids with less than 10 wt % unsaponifiables in its series of Sylfat® tall oil fatty acids.

The content of unsaponifiables can be determined by simple distillation.

In preferred embodiments of this invention, the tall oil fatty acid used is of very high purity. Tall oil fatty acids of "very high purity" are defined herein as comprising less than 10 wt % unsaponifiable impurities, and less than 1 wt %, and, in increasing preference, less than 0.5 wt %, 0.4 wt %, 0.3 wt %, 0.2 wt % and 0.1 wt %, based on the total weight of the tall oil fatty acid, of rosin acid. These very high purity tall oil fatty acids have an acid number of 192 or more, preferably above 194, and a color Gardner value of 5 or less, preferably less than 4.5. The total unsaponifiables for these very high purity tall oil fatty acids is typically less than 5 wt % and can be below 2 wt % unsaponifiables.

The content of rosin acids in tall oil products can be determined by known procedures such as those described in ASTM D803-93 and ASTM 1240-93. The tall oil product is refluxed with methanol and sulfuric acid to esterify the fatty acids present, which are then separated. The rosin acids are then titrated from the remaining sample, typically with KOH. The rosin acid content s is determined by the following equation:

% rosin acids=$1.031 \times V \times N \times 30.2 - 0.74$/sample weight (g)

V=volume of alkali (KOH) solution required for titration of the specimen; and

N=normality of the alkali (KOH) solution.

The term "pitch," as used herein, refers to tall oil pitch. It is considered an "unsaponifiable" herein and comprises the residues from the distillation of tall oil. They are composed primarily of high-boiling esters of fatty acids and rosin. They may contain neutral materials, free fatty acids and rosin acids. It is preferable that the amount of pitch within the tall oil fatty acid is less than 1 wt %, and, in increasing preference, is less than 0.5 wt %, 0.4 wt %, 0.3 wt %, 0.2 wt % and 0.1 wt %, based on the total weight of the tall oil fatty acid.

The terms "rosin" and "rosin bottoms," as used herein, each refer to a complex composition derived from wood, especially pine wood. This composition is considered an "unsaponifiable" herein and is primarily composed of rosin acids and modified rosin acids such as dimers and decarboxylated rosin acids. This composition includes rosin stabilized by catalytic disproportionation. It is preferable that the amount of rosin within the tall oil fatty acid is less than 2.2 wt %, and, in increasing preference, is less than 1.0 wt %, 0.5 wt %, 0.4 wt %, 0.3 wt %, 0.2 wt % and 0.1 wt %, based on the total weight of the tall oil fatty acid.

"DTO" is considered an "unsaponifiable" herein and comprises a complex combination of tall oil rosin and fatty acids derived from the acidulation of crude tall oil soap and including that which is further refined. DTO typically contains at least 10% rosin.

The acid number of very high purity tall oil products is determined by ASTM D465-96. "Acid number of naval stores products including tall oil and other related products." Section 10.1 states "Calculate the acid number of the sample, expressed as milligrams KOH per gram of sample as follows, and report to the nearest whole number:

Acid number ($A \times N \times 56.1$)/B; where

A=volume of alkali (KOH) solution required for titration of the specimen;

N=normality of the alkali (KOH) solution; and

B=specimen weight, g.

Color Gardner values of the very high purity tall oil fatty acids are determined by conventional equipment and techniques.

Very high purity tall oil fatty acids can be obtained by further purification of commercially available tall oil fatty acids, such as those with less than 10 wt % unsaponifiables, by conventional purification methods, such as distillation, or they can be prepared directly from raw materials. When combined with synthetic wax or silicone resin, the tall oil fatty acid need not be of very high purity, but tall oil fatty acids of very high purity are preferred for these release agents.

Suitable synthetic waxes typically have a softening point from 100° C. to 170° C., a penetration hardness of 0.1 to 5 dmm and a number average molecular weight of from about 3000 to 30,000. Synthetic waxes used in the present invention do not include natural waxes such as Montan and carnauba waxes. The term is intended to include all synthetic waxes except polyethylene wax. These synthetic waxes include Fischer-Tropsch wax, chlorinated naphthalene wax, chemically modified wax, substituted amide wax, ester waxes, polymerized alpha olefin waxes, or blends thereof. Examples of suitable polymerized alpha olefin waxes are described in U.S. Pat. Nos. 4,060,569 and 4,239,546, which are incorporated herein by reference. Preferred synthetic waxes include polyethylene glycol and ethylene bissstearamide. Preferred waxes disperse or emulsify in aqueous media without functionalization to improve their dispersibility/emulsification.

Although not preferred, the wax may be functionalized in order to improve dispersibility/emulsification in aqueous media. This typically means that the waxes are oxidized. In a typical process, the wax is placed in a vessel, such as a pressure autoclave, and subjected to heat, typically 120° C.–160° C., and pressure while being sparged with oxygen or air. Such oxidation is not preferred.

Emulsions of the synthetic waxes can be prepared by conventional means using conventional emulsifiers including anionic, cationic, or non-anionic emulsifiers. Examples include those disclosed in U.S. Pat. No. 6,132,503. The amount of emulsifier typically ranges from about 1 to 10 wt % of the total release agent.

The synthetic wax and/or silicone resin significantly improve the memory of the release agent to allow for shut down of the line. With ethylene bissstearamide and/or silicone resin, memory up to and beyond 3 hours can be achieved.

Although the concentration of the tall oil fatty acid and synthetic wax (where used) within the release composition can vary widely from concentrates to "ready to use" formulations, a preferred concentrate contains up to about 23 wt % tall oil fatty acids, typically 18% to 20 wt % tall oil fatty acids. Such a concentrate of the release agent can be easily diluted as needed. Where used, the synthetic wax comprises 0.25–5 wt %, preferably 1.5 wt % of the total solids within this concentrate. The release agent may contain less than 10 wt % tall oil fatty acids and less than 1 wt % wax when diluted. The release agents of this invention provide greatly improved efficiencies in that less is needed in relation to other products made from potassium salts of tall oil fatty acids. The release agent of this invention gives acceptable release properties at 0.8 gram solution per square foot (at 10 wt % solids) while conventional products typically require 1.2 to 1.6 grams solution per square foot(at 10 wt % solids).

The release agents of the present invention may optionally contain additional additives to enhance the release properties or provide an additive effect. Conventional additives for release agents which provide an additive effect such as preservatives, biocides, anti-foaming agents, corrosion inhibitors, surfactants, flame retardants, etc. are suitable. Conventional additives which enhance the release properties of the release agent such as, for example, the addition of vegetable oil such as castor oil for concrete release agents, are suitable.

Preferred embodiments of this invention include additives which inhibit corrosion. Particularly preferred embodiments are those which include anticorrosive agents which bind the dissolved oxygen within the aqueous carrier to deoxygenate the water present. Mixtures of anticorrosive agents are preferred. The amount used preferably falls within the range of 0.0005 wt % and 0.01 wt %, based on total weight of the release agent. The composition of the mixture and the amount used depends on the needs of the end user.

An example of a suitable anticorrosive agent which binds dissolved oxygen is DEHA, diethyl hydroxyl amine, (CAS 3710-84-7). When used in mixtures, it is preferably used in an amount of 10–20 wt %, based on the weight of the mixture. Other conventional anticorrosive agents can be added with DEHA such as:

dimethyl amide to coat steel, typically in an amount of 8–20 wt %, based on the weight of the mixture, and/or morpholine (CAS 110-91-8) to neutralize carbonic acid, typically in an amount of 5–15 wt %, based on the weight of the mixture, and/or diethylaminoethanol (CAS 100-37-8) to neutralize carbonic acid, typically in an amount of 5–15 wt %, based on the weight of the mixture, and/or cyclohexylamine, (CAS 108-91-8) to neutralize carbonic acid, typically in an amount of 5–15 wt %, based on the weight of the mixture.

The release agents of the present invention are well suited for molding lignocellulosic materials, pre-cast concrete, and polyurethane foam in automobile and marine manufacturing. They are also well suited for use in textile manufacturing. These release agents can essentially be used on any equipment wherein these materials are handled and processed such as open or closed molds, including press molds which employ press platens or two piece molds which are pressed/locked together. These molds can be made of metal, concrete or wood. The release agent of the present invention is preferably used with metal press platens and molds.

Examples of the lignocellulosic materials which can be molded include wood strands, wood chips, wood fibers, shavings, veneers, wood wool, cork, tree bark, sawdust, paper straw, flax, hulls, seeds, and nutshells. There may be added to these lignocellulosic materials other particulate or fibrous material in an amount of up to 25 wt %. These include mineral fillers, glass fibers, rubber, plastic fibers, or particles.

The products that can be made from lignocellulosic materials include particle board, oriented strand board (OSB), plywood, chip board, medium density fiber board (MDF), hardboard and structural strand lumber.

The method of this invention comprises applying the release agent of the present invention to the surfaces of a mold or to the surfaces of the material to be molded or both the surfaces of a mold and the surfaces of the material to be molded and molding the material under pressure to a finished article. In the case of lignocellulosic materials, heat is applied to crosslink the adhesive. The preferred amount of release agent varies depending upon the particular lignocellulosic material being sprayed and the conditions in the mill.

When molding lignocellulosic material, it is brought into contact with a conventional polyisocyanate binding material by means of mixing, blending, spraying or spreading the polyisocyanate composition with or onto the lignocellulosic material. This can take place using conventional equipment.

Examples of polyisocyanates which can be used for molding lignocellulosic materials include polymerized aliphatic isocyanates such as hexamethylene diisocyanate, aromatic isocyanates such as m-phenylene diisocyanate, p-phenylene diisocyanate, toluene-2,4-diisocyanate, tolylene-2,6-diisocyanate, diphenylmethane-4,4'-diisocyanate, chlorophenylene-2,4-diisocyanate, naphthylene-1,5-diisocyanate, diphenylene-4,4'-diisocyanate, and the like. A mixture of isocyanates can be used as well as modified isocyanates as disclosed in U.S. Pat. No. 6,132,503. One preferred group of polyisocyanates are methylene group polyisocyanates referred to as "polymeric MDI." The polyisocyanate adhesive is typically applied in an amount of 0.1 to 25 wt % of the dry lignocellulosic material.

Thereafter, the treated lignocellulosic materials is formed into a mat, typically on a screen, and conveyed to a press, where pressure is applied at elevated temperatures. Pressures typically range from 2 to 6 MPa and temperatures typically range from 120° C. to 250° C. It is recognized that these techniques are conventional and would be modified as needed.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

Example 1-100A

A release agent of the present invention is synthesized with the following components and properties:
Tall oil fatty acids=15–16.75 wt %, (target 16.09 wt %);
KOH (45% solids)=5.4 to 7.2 wt %, (target 6.6 wt %);
water 75.8 to 78.5 wt %, (target 77.31 wt %);
total solids=18 to 23 wt %, (target 21%);
pH=10.4 to 11.2, (target 10.9);
Unsaponifiables<5%,
rosin acids<10% of a total unsaponifiables;
pitch<10% of a total unsaponifiables Acid number>192 and
color Gardner=5 or less.

Example 2-400A

A release agent of the present invention is synthesized with the following components and properties:

Tall oil fatty acid=15.0–16.4 wt %, (target=15.75 wt %);
KOH (45% solids)=5.8 to 7.3 wt %, (target 6.46 wt %);
Synthetic wax$^a$ (145 WS)=0.75–1.5 wt %, (target 1.0 wt %)
water=74.7 to 76.7 wt % (target 75.69 wt %);
additives$^b$ (50% solids)=0.5 to 4.5 wt %, (target 2.0 wt %);
total solids=18 to 23 wt % (target 21%);
pH=10.8 to 11.4 (target 10.9);
Unsaponifiables<5%,
rosin acids<10% of a total unsaponifiables;
pitch<10% of a total unsaponifiables;
Acid number>192 and
color Gardner 5 or less.

$^a$ Ethylene bisstearamide $^b$ The additives comprise 0.05 to 1.5 wt %, (target 1.0 wt %), based on the weight of the release agent, of a mixture of the following anticorrosion agents:

dimethyl amide, (8–20 wt %, based on the weight of the mixture);
morpholine (CAS 110-91-8), (5–15 wt %, based on the weight of the mixture);
diethylaminoethanol (CAS 100-37-8), (5–15 wt %, based on the weight of the mixture);
cyclohexylamine, (CAS 108-91-8), (5–15 wt %, based on the weight of the mixture);
DEHA, diethylhyroxyamine (CAS 3710-84-7), (10–20 wt %, based on the weight of the mixture).

The amount of anticorrosive agent and components within the mixture is dependent on the needs of a particular mill.

Example 3-500A

A release agent of the present invention is synthesized with the following components and properties:

Tall oil fatty acids=15.0–16.4 wt %, (target=15.75 wt %);
KOH (45% solids)=5.8 to 7.3 wt %, (target 6.46 wt %);
Silicone$^c$=0.5 to 4.5 wt %;
water=74.7 to 76.7 wt % (target 75.69 wt %);
additives$^d$ (50% solids)=0.5 to 4.5 wt %, (target 2.0 wt %);
total solids=18 to 23 wt % (target 21%);
pH=10.8 to 11.4 (target 10.9);
Unsaponifiables<5%,
rosin acids<10% of a total unsaponifiables;
pitch<10% of a total unsaponifiables;
Acid number>192 and
color Gardner 5 or less.

$^c$ polydimethylsiloxane $^d$ The additives comprise 0.05 to 1.5 wt %, (target 1.0 wt %), based on the weight of the release agent, of a mixture of the following anticorrosion agents:

dimethyl amide, (8–20 wt %, based on the weight of the mixture);
morpholine (CAS 110-91-8), (5–15 wt %, based on the weight of the mixture);
diethylaminoethanol (CAS 100-37-8), (5–15 wt %, based on the weight of the mixture);
cyclohexylamine, (CAS 108-91-8), (5–15 wt %, based on the weight of the mixture);
DEHA, diethylhyroxyamine (CAS 3710-84-7), (10–20 wt %, based on the weight of the mixture).

The amount of anticorrosive agent and components within the mixture is dependent on the needs of a particular mill.

Example 4

The Preparation of OSB

Wood chips, 5 mesh, are sprayed with a polyisocyanate adhesive available commercially from Imperial Chemical Industries at a 6% loading based on dry wood. The wood moisture content before spraying with adhesive is about 2 wt %. The treated pine flakes are placed on a woven steel screen and formed into a mat having a thickness of 8 to 12 inches. The press platen temperature is between 350–500° F. and the board size is 200×400×4 mm. The web is sprayed with a release agent of Example 1 diluted about 75% with water. The mats are inserted in the press and the press cycle is started. The mats and screen are pressed in a 200 ton press at 350–500° F. for about 2–5 minutes.

The boards are released from the presses after each press cycle.

Example 5

Another Preparation of OSB

A ¼" OSB is prepared from twenty pounds of pine flakes blended with a polyisocyanate adhesive available from ICI Americas to provide 4 wt % polyisocyanate, based on the dry weight of the flakes. The treated pine flakes are placed on a woven steel screen and formed into a mat having a thickness of 8–12 inches. The surface of the mat is then sprayed with a release agent as in Example 2, diluted approximately 75% with water. The mat and screen are pressed in a 200 ton press at 350–500° F. for about 2–5 minutes. The boards release easily after each pressing.

The entire disclosures of all applications, patents and publications, cited herein, and of corresponding provisional application No. 60/359,379, filed Feb. 26, 2002, and U.S. Provisional Application Ser. No. 60/358,378, filed Feb. 22, 2002, are incorporated by reference herein.

The invention claimed is:

1. A release agent comprising:
a) an alkali metal salt of a rail oil fatty acid which contains less than 10 wt% based on the total weight of said tall oil fatty acid, of unsaponifiable impurities and less than 1 wt % of rosin acid, based on the total weight of said tall oil fatty acid;
wherein said tall oil fatty acid has an acid number of 192 or more and a color Gardner value of 5 or less, and
b) an aqueous liquid carrier.

2. A release agent as in claim 1 wherein said alkali metal salt of a tall oil fatty acid is a potassium salt.

3. A release agent as in claim 2 wherein the tall oil fatty acid has less than 1 wt % pitch.

4. A release agent as in claim 2 wherein the tall oil fatty acid has less than 0.2 wt % rosin acid.

5. A release agent as in claim 4 wherein the tall oil fatty acid has an acid number greater than 194 and a color Gardner value of less than 4.5.

6. A release agent as in claim 1 which contains an additional additive to enhance the release properties selected from oils, waxes, polishes, metallic salts, silicones and polytetrafluoroethylene.

7. A release agent as in claim 6 wherein the additive to enhance the release properties is a vegetable oil.

8. A release agent as in claim 7 wherein the vegetable oil is castor oil.

9. A release agent as in claim 1 which contains an additional additive selected from preservatives, biocides, anti-foaming agents, anticorrosive agents, surfactants and flame retardants.

10. A release agent as in claim 9 which contains as an anticorrosive agent, compounds that bind dissolved oxygen within the aqueous carrier, compounds that neutralize carbonic acid in the release agent, compounds that provide a protective coating on steel or combinations thereof.

11. A release agent as claim 10 which contains an anticorrosive agent that binds dissolved oxygen within the aqueous carrier.

12. A release agent as claim 11 wherein the anticorrosive agent is DEHA.

13. A release agent as in claim 1 which provides release properties to lignocellulosic materials on metal at levels from 0.1–1.0 milligrams of solids/cm$^2$ of surface area.

14. A method of using the release agent of claim 1 comprising applying said release agent to the surface of a mold or platen.

15. A method for the manufacture of molded articles comprising:
applying to a mold surface, a release agent of claim 1; and
molding lignocellulosic material or concrete or polyurethane foam in said mold.

16. A release agent which comprises:
a) an alkali metal salt of tall oil fatty acid which contains less than 10 wt %, based on the total weight of said tall oil fatty acids, of unsaponifiable impurities;
b) a wax; and
c) an aqueous liquid carrier; and
which contains less than 1 wt % of rosin acid, based on the total weight of said tall oil fatty acid; and said tall oil fatty acid has an acid number of 192 or more and a color Gardner value of 5 or less.

17. A release agent as in claim 16 wherein said alkali metal salt of a tail oil fatty acid is a potassium salt.

18. A release agent as in claim 17 wherein the tall oil fatty acid has less than 1 wt % pitch.

19. A release agent as in claim 17 wherein the tall oil fatty acid has less than 0.2 wt % rosin acid.

20. A release agent as in claim 19 wherein the tall oil fatty acid has an acid number greater than 194 and a color Gardner value of less than 4.5.

21. A release agent as in claim 17 wherein the wax is polyethylene glycol or ethylene bisstearamide.

22. A release agent as in claim 17 which contains an additional additive to enhance the release properties selected from oils, natural waxes, polyethylene wax, polishes, silicones and polytetrafluoroethylene.

23. A release agent as in claim 22 wherein the additive to enhance the release properties is a vegetable oil.

24. A release agent as in claim 23 wherein the vegetable oil is castor oil.

25. A release agent as in claim 17 which contains an additional additive selected from preservatives, biocides, anti-foaming agents, anticorrosive agents, surfactants and flame retardants.

26. A release agent as in claim 17 which provides release properties to lignocellulosic materials on metal at levels from 0.1–1.0 milligrams of solids/cm$^2$ of surface area.

27. A release agent as in claim 17 which has a memory of three hours and above.

28. A release agent which comprises:
a) an alkali metal salt of a tall oil fatty acid which contains less than 10 wt %, based on the total weight of said tall oil fatty acids, of unsaponifiable impurities;
b) polydimethylsiloxane; and
c) an aqueous liquid carrier; and
which contains less than 1 wt % of rosin acid, based on the total weight of said tall oil fatty acid; and said tall oil fatty acid has an acid number of 192 or more and a color Gardner value of 5 or less.

29. A release agent as in claim 28 wherein said alkali metal salt of a tall oil fatty acid is a potassium salt and the tall oil fatty acid has less than 1 wt % pitch, less than 2.2 wt % rosin, an acid number greater than 194 and a color Gardner value of less than 4.5.

30. A release agent as in claim 29 which contains an additional additive to enhance the release properties selected from oils, natural waxes, polyethylene wax, polishes, metallic salts, silicones and polytetrafluoroethylene.

31. A release agent as in claim 30 wherein the additive to enhance the release properties is castor oil.

32. A release agent as in claim 29 which contains an additional additive selected from preservatives, biocides, anti-foaming agents, corrosion inhibitors, surfactants and flame retardants.

33. A release agent as in claim 32 which contains as a corrosion inhibitor, a compound that binds dissolved oxygen within the aqueous carrier, a compound that neutralize carbonic acid in the release agent, a compound that provides a protective coating on steel or a combination thereof.

34. A release agent as in claim 33 which contains a corrosion inhibitor that binds dissolved oxygen within the aqueous carrier.

35. A release agent as in claim 34 wherein the corrosion inhibitor is DEHA.

36. A release agent as in claim 29 which provides release properties to lignocellulosic materials on metal at levels from 0.1–1.0 milligrams of solids/cm$^2$ of surface area.

37. A release agent as in claim 29 which has a memory of three hours and above.

* * * * *

UNITED STATES PATENT AND TRADEMARK OFFICE
CERTIFICATE OF CORRECTION

PATENT NO.        : 7,018,461 B2                                              Page 1 of 1
APPLICATION NO. : 10/321517
DATED             : March 28, 2006
INVENTOR(S)       : Massidda et al.

It is certified that error appears in the above-identified patent and that said Letters Patent is hereby corrected as shown below:

On the Title page, item [75], Inventors: line 2, reads "Alan" should read -- Allan --
Column 8, line 45, reads, "a rail oil" should read -- a tall oil --
Column 9, line 12, reads "as claim" should read -- as in claim --
Column 9, line 15, reads "as claim" should read -- as in claim --
Column 9, line 39, reads "a tail oil" should read -- a tall oil --
Column 10, line 40, reads "that neutralize" should read -- that neutralizes --

Signed and Sealed this

Eleventh Day of July, 2006

JON W. DUDAS
*Director of the United States Patent and Trademark Office*